(12) United States Patent
Guang et al.

(10) Patent No.: US 12,073,186 B1
(45) Date of Patent: Aug. 27, 2024

(54) MACHINE LEARNING REPORT GENERATION

(71) Applicant: Jumio Corporation, Palo Alto, CA (US)

(72) Inventors: Lei Guang, Montreal (CA); Lars Soldahl, Antioch, CA (US)

(73) Assignee: Jumio Corporation, Sunnyvale, CA (US)

( * ) Notice: Subject to any disclaimer, the term of this patent is extended or adjusted under 35 U.S.C. 154(b) by 306 days.

(21) Appl. No.: 17/491,446

(22) Filed: Sep. 30, 2021

(51) Int. Cl.
*G06F 40/40* (2020.01)
*G06F 40/174* (2020.01)
*G06F 40/186* (2020.01)
*G06N 20/00* (2019.01)

(52) U.S. Cl.
CPC ............ *G06F 40/40* (2020.01); *G06F 40/174* (2020.01); *G06F 40/186* (2020.01); *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 11,106,736 B1* | 8/2021 | Newman ................ | G06F 16/955 |
| 11,431,519 B1* | 8/2022 | Bullard ................. | H04L 51/212 |
| 2016/0232152 A1* | 8/2016 | Mahamood ........... | G06F 40/186 |
| 2016/0358268 A1* | 12/2016 | Verma ..................... | G06N 20/10 |
| 2018/0130071 A1* | 5/2018 | Yao ................... | G06K 19/06009 |
| 2018/0137401 A1* | 5/2018 | Kumar .................. | G06F 16/245 |
| 2019/0122226 A1* | 4/2019 | Ekambaram ........ | H04L 63/1408 |
| 2019/0260764 A1* | 8/2019 | Humphrey .......... | H04L 63/1433 |
| 2019/0340235 A1* | 11/2019 | Osbourne ............. | G10L 19/083 |
| 2021/0264272 A1* | 8/2021 | Luo ........................ | G06N 3/084 |
| 2022/0044199 A1* | 2/2022 | Pati ........................ | G06Q 40/02 |

* cited by examiner

*Primary Examiner* — Jesse S Pullias
(74) *Attorney, Agent, or Firm* — Patent Law Works LLP

(57) ABSTRACT

The disclosure includes a system and method for receiving, using one or more processors, a case; mapping, using the one or more processors, a first label to one or more reportable activities in one or more jurisdictions, the first label associated with the case; prepopulating, using the one or more processors, one or more reports, the one or more reports reporting the one or more activities in the one or more jurisdictions; generating, using the one or more processors, a template-based narrative, wherein the template is based on the first label, the first label associated with a first category of activities; generating, using the one or more processors, a natural language narrative by applying natural language generation associated with the first category of activities to the template-based narrative; and prepopulating, using the one or more processors, a form field with the natural language narrative.

19 Claims, 15 Drawing Sheets

Label: Arms Dealing 510

| Jurisdiction | Terrorism | Crime | Customs Violation |
|---|---|---|---|
| US | | | X |
| EU | X | | X |
| CN | | X | X |

Label: Gambling 530

| Jurisdiction | State Lottery | Bingo | Tribal Casino | Card Room | Horse Race | Sports Betting |
|---|---|---|---|---|---|---|
| CA | | | | | | X |
| NV | | | X | X | | |
| UT | X | | | | X | X |

MACHINE LEARNING REPORT GENERATION

BACKGROUND

When suspicious activity is identified, a case may be opened to investigate the suspicious activity. Upon investigation, the case may be escalated and a Suspicious Activity Report (SAR) generated. Filling out a SAR may be time consuming and different jurisdictions may define different reportable activity and have different SAR requirements.

SUMMARY

This specification relates to methods and systems for receiving, using one or more processors, a case; mapping, using the one or more processors, a first label to one or more reportable activities in one or more jurisdictions, the first label associated with the case; prepopulating, using the one or more processors, one or more reports, the one or more reports reporting the one or more reportable activities in the one or more jurisdictions; generating, using the one or more processors, a template-based narrative, where the template is based on the first label, the first label associated with a first category of activities; generating, using the one or more processors, a natural language narrative by applying natural language generation associated with the first category of activities to the template-based narrative; and prepopulating, using the one or more processors, a form field with the natural language narrative.

Other implementations of one or more of these aspects include corresponding systems, apparatus, and computer programs, configured to perform the actions of the methods, encoded on computer storage devices.

These and other implementations may each optionally include one or more of the following features. For instance, the actions may include generating, based on machine learning, the first label as a suggested label, the first label unassociated with the case at a time the case was received; and applying the first label to the case based on user input. For instance, the case includes a set of initial labels including the first label, where the set of initial labels are generated based on machine learning. For instance, the actions may include receiving, based on user input, a modification to an initial set of labels associated with the case, the modification including the first label; and retraining a machine learning model that generates initial sets of labels associated with cases. For instance, the template uses heuristics to generate the template-based narrative. For instance, the actions may include receiving a plurality of human-written reports; determining a subset of the human-written reports based on cases associated with the first label and the first category of activities; generating a template-based narrative for each of the human-written reports in the subset of human-written reports based on cases associated with the first label and the first category of activities; and training the natural language generation based on the template-based narratives generated for each of the human-written reports in the subset of human-written reports based on cases associated with the first label and the first category of activities and the subset of human-written reports. For instance, the first label is also associated with a second category of activities, and natural language narratives for cases associated with the first label and the second category activities use a distinct natural language generation trained based on template-based narratives generated for human-written reports based on cases associated with the first label and the second category of activities and the human-written reports based on cases associated with the first label and the second category of activities, where the actions may include: generating a second template-based narrative based on the first label in association with a second category of activities; and generating a second natural language narrative by applying the distinct natural language generation associated with the second category of activities to the second template-based narrative.

This specification also relates to methods and systems for receiving, using one or more processors, a case; mapping, using the one or more processors, a first label to one or more reportable activities in one or more jurisdictions, the first label associated with the case; and prepopulating, using the one or more processors, one or more reports, the one or more reports reporting the one or more reportable activities in the one or more jurisdictions.

Other implementations of one or more of these aspects include corresponding systems, apparatus, and computer programs, configured to perform the actions of the methods, encoded on computer storage devices.

These and other implementations may each optionally include one or more of the following features. For instance, the actions may include generating, based on machine learning, the first label as a suggested label, the first label unassociated with the case at a time the case was received; and applying the first label to the case based on user input. For instance, the case includes a set of initial labels including the first label, where the set of initial labels are generated based on machine learning. For instance, the actions may include receiving, based on user input, a modification to an initial set of labels associated with the case, the modification including the first label; and retraining a machine learning model that generates initial sets of labels associated with cases.

This specification also relates to methods and systems for generating, using one or more processors, a template-based narrative, where the template is based on a first label, the first label associated with a first category of activities; generating, using the one or more processors, a natural language narrative by applying natural language generation associated with the first category of activities to the template-based narrative; and prepopulating, using the one or more processors, a form field with the natural language narrative.

Other implementations of one or more of these aspects include corresponding systems, apparatus, and computer programs, configured to perform the actions of the methods, encoded on computer storage devices.

These and other implementations may each optionally include one or more of the following features. For instance, the template uses heuristics to generate the template-based narrative. For instance, the actions may include receiving a plurality of human-written reports; determining a subset of the human-written reports based on cases associated with the first label and the first category of activities; generating a template-based narrative for each of the human-written reports in the subset of human-written reports based on cases associated with the first label and the first category of activities; and training the natural language generation based on the template-based narratives generated for each of the human-written reports in the subset of human-written reports based on cases associated with the first label and the first category of activities and the subset of human-written reports. For instance, the first label is also associated with a second category of activities, and natural language narratives for cases associated with the first label and the second category activities use a distinct natural language generation trained based on template-based narratives generated for human-written reports based on cases associated with the first label and the second category of activities and the human-written reports based on cases associated with the first label and the second category of activities, the actions may include: generating a second template-based narrative based on the first label in association with a second category of activities; and generating a second natural language narrative by applying the distinct natural language generation associated with the second category of activities to the second template-based narrative.

BRIEF DESCRIPTION OF THE DRAWINGS

The disclosure is illustrated by way of example, and not by way of limitation in the figures of the accompanying drawings in which like reference numerals are used to refer to similar elements.

FIG. 5a illustrates an example of a label-report map in accordance with some implementations.

FIG. 5b illustrates another example of a label-report map in accordance with some implementations.

FIGS. 10a-d illustrate example user interfaces associated with label editing in accordance with some implementations.

DETAILED DESCRIPTION

Figure 1:
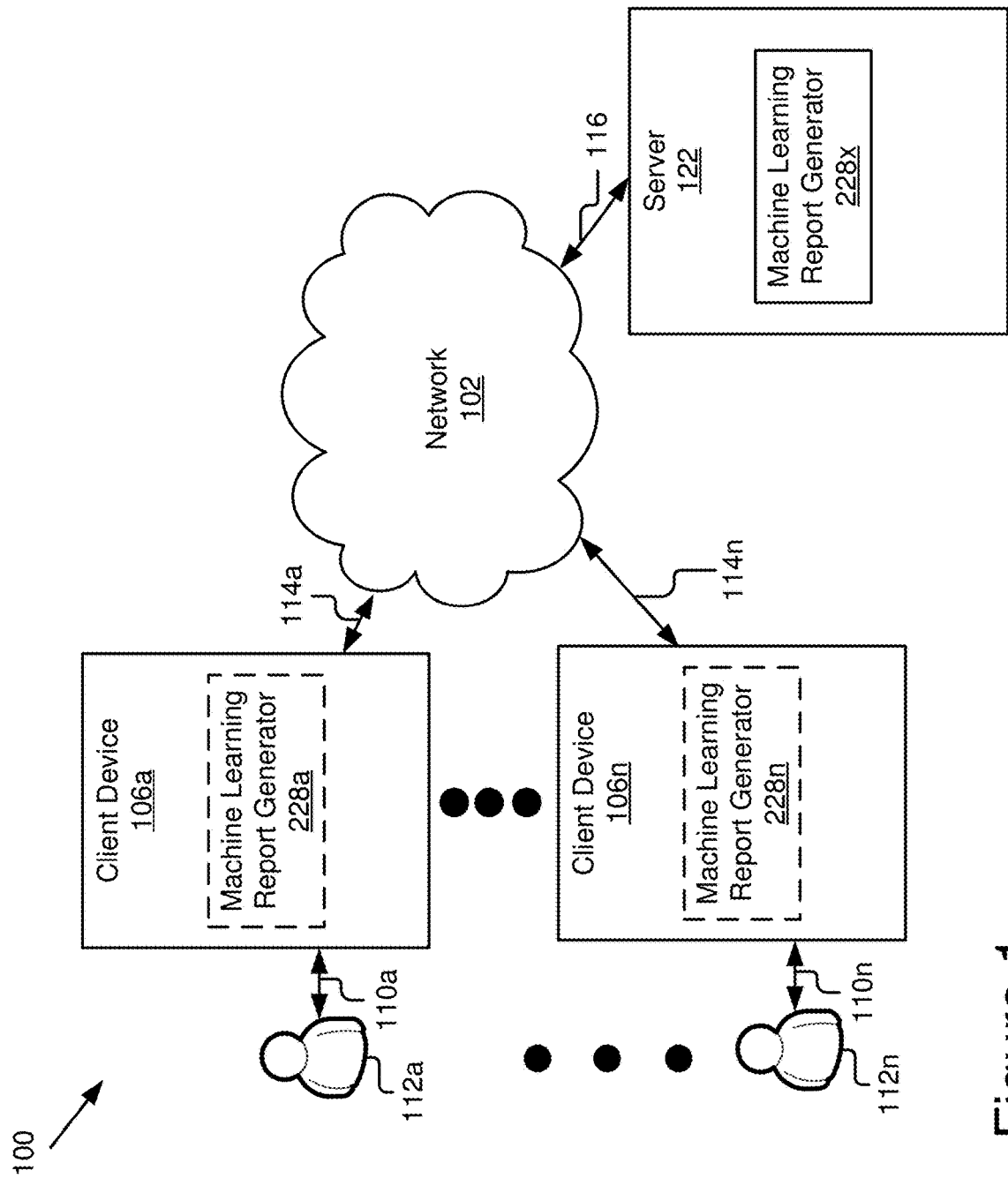
FIG. 1 illustrates a block diagram of one example system for generating a report using machine learning in accordance with some implementations.

Entities, such as banks, may seek to identify suspicious activity. For example, an entity may seek to identify and report suspicious activity to comply with regulations of one or more jurisdictions (e.g., to prevent terrorist financing, to prevent money laundering, etc.).

When suspicious activity is identified, a case may be opened to investigate the suspicious activity. Upon investigation, the case may be escalated and a Suspicious Activity Report (SAR) generated and filed. Filling out a SAR may be time consuming and different jurisdictions may define different reportable activity and have different SAR requirements.

Because of technology, the amount of activity (e.g., the number of transactions) an entity is involved in and/or reviews is trending upward. Additionally, the world's economy has become more globalized and complex, which means the number of jurisdictions to which an entity may have to report and the types of reportable activities have also been trending upward. Therefore, the number of SARs to be filed is also trending upward.

Present systems rely on human agents to investigate a case, determine whether to escalate the case to a SAR, and fill out a SAR. A first problem with such systems is escalation inconsistency. Specifically, present systems lack a mechanism for ensuring consistency in how instances of similar suspicious activity are escalated to a SAR or not escalated, as the case may be. The system and methods described herein may beneficially provide increased escalation consistency.

A second problem is that reportable activity changes over time and jurisdiction-to-jurisdiction. With an increasingly globalized economy, the number of jurisdictions to which an entity may have to report, and often report differently, and the number of potentially reportable activities has been trending upward. The system and methods described herein may beneficially track the various reportable activities in each jurisdiction and map suspicious activity to reportable activity in one or more jurisdictions to ensure proper reporting.

A third problem with existing systems is SAR content inconsistency. Specifically, present systems do not ensure consistency SAR-to-SAR in the content of a SAR describing similar activity and reported to the same jurisdiction. For example, different (human) case agents may include different content or include the content differently (e.g., in different form fields) in a SAR if given the same case and preparing a SAR for the same jurisdiction. The system and methods herein may beneficially increase the consistency of the content and presentation of the content in reports.

A fourth problem with existing systems is that the investigation and SAR generation is time consuming. Determining, by a human case agent relying on his/her training and experience, whether suspicious activity may be characterized as a reportable activity in any of a myriad of jurisdictions to which an entity reports, where each jurisdiction may define different suspicious activities or the same suspicious activity differently; identifying the pertinent information for each relevant jurisdiction, where the pertinent information, or content, may jurisdiction-to-jurisdiction; and articulating a case including the pertinent information in a clear, concise, and persuasive manner takes time and experience. The system and methods herein may beneficially reduce the time taken to complete a report, which may result in identifying and stopping bad actors more quickly and accurately.

It should be recognized that the description and language herein is selected for clarity and convenience. Therefore, while the present disclosure refers to SARs, labels associated with suspicious activity that may be reportable on a SAR, and narratives associated with a SAR, other reports, labels, and narratives are within the scope of the present disclosure.

Example System

FIG. 1 is a block diagram of an example system 100 machine learning report generation in accordance with some implementations. As depicted, the system 100 includes a server 122 and client devices 106a and 106n coupled for electronic communication via a network 102. The client devices 106a or 106n may occasionally be referred to herein individually as a client device 106 or collectively as client devices 106. Although two client devices 106 are shown in FIG. 1, it should be understood that there may be any number of client devices 106.

A client device 106 is a computing device that includes a processor, a memory, and network communication capabilities (e.g., a communication unit). The client device 106 is coupled for electronic communication to the network 102, as illustrated by signal line 114, and may be accessed by a user 112 as illustrated by line 110. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although two client devices 106 are shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

In some implementations, the user 112 is a human user and occasionally referred to herein as person, individual, or similar.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may optionally (as indicated by the dashed lines) include an instance of the machine learning (ML) report generator 228*a/n* and the server 122 may include an instance of the ML Report Generator 228*x*. However, in some implementations, the components and functionality of the ML Report Generator 228 may be entirely client-side (i.e., at 228*a/n*), entirely server side (i.e., at 228*x*), or divide among the client device 106 and server 122 (i.e., divided across 228*a/n* and 228*x*).

Figure 2:
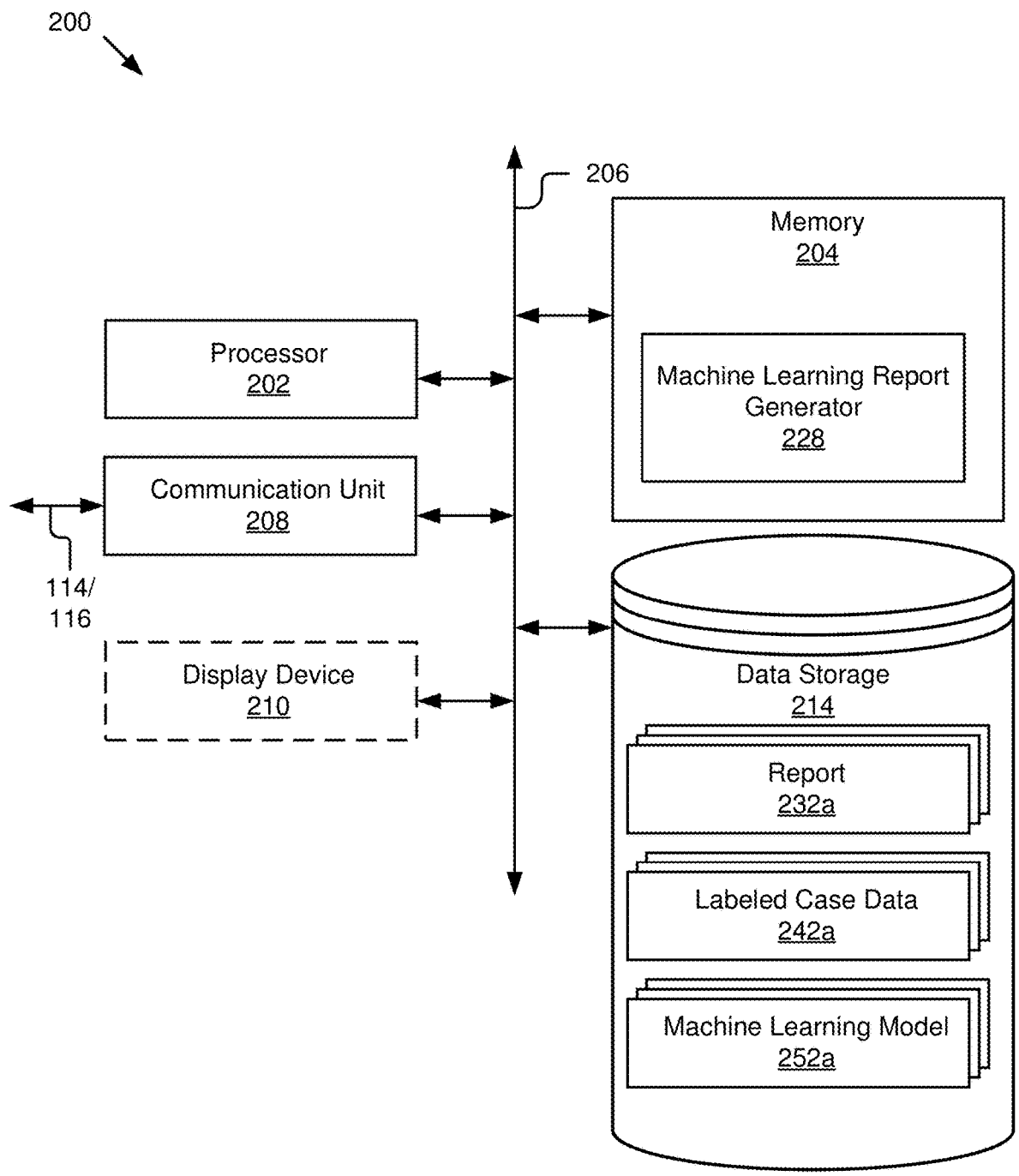
FIG. 2 illustrates a block diagram of an example computing device in accordance with some implementations.

FIG. 2 is a block diagram of an example computing device 200 including an instance of the ML Report Generator 228. In the illustrated example, the example the computing device 200 includes a processor 202, a memory 204, a communication unit 208, a display device 210, and a data storage 214. In one implementation, the computing device 200 is a client device 106, the memory 204 stores the ML Report Generator 228*a*, and the communication unit 208 is communicatively coupled to the network via signal line 114. In another implementation, the computing device 200 is a server 122, the memory 204 stores the ML Report Generator 228*x*, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the machine learning report generator 228. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The memory stores the machine learning report generator 228. The machine learning report generator 228 may include software and/or logic for generating a report. The machine learning report generator 228 is coupled to operate in conjunction with the processor 202 to generate a report including one or more of using labels and generating a natural language.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 210 is a conventional type such as a liquid crystal display (LCD), light emitting diode (LED), touchscreen, or any other similarly equipped display device, screen, or monitor. The display device 210 represents any device equipped to display electronic images and data as described herein.

The data storage 214 is a non-transitory memory that stores data for providing the functionality described herein. The data storage 214 may include one or more non-transitory computer-readable mediums for storing the data. In some implementations, the data storage 214 may be incorporated with the memory 204 or may be distinct therefrom. The data storage 214 may be a dynamic random-access memory (DRAM) device, a static random-access memory (SRAM) device, flash memory, or some other memory devices. In some implementations, the data storage 214 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 214 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The data storage 214 is communicatively coupled to the bus 206. The data storage 214 may store, among other data, one or more reports 232, e.g., illustrated collectively by report 232a and the other boxes associated with other report instances (unlabeled) behind report 232a, one or more labeled case data 242, e.g., illustrated collectively by labeled case data 242a and the other boxes associated with other instances (unlabeled) of labeled case data layered behind labeled case data 242a, one or more machine learning models 252, or algorithms, e.g., illustrated collectively by machine learning model 252a and the other boxes associated with other instances (unlabeled) of machine learning models layered behind machine learning model 252a. In some implementations, a case is associated with labels and as represented by labeled case data 242. For example, Case A may be represented by the instance of labeled case data 242a. A case may be closed, e.g., upon investigation, the suspicious activity associated with the case was determined to be benign so the case was closed. Alternatively, a case may be escalated and the activity reported in a report 232, e.g., because, upon investigation, the suspicious activity associated with a case is determined to be reportable activity (e.g., illegal, fraudulent, etc.) by a bad actor (e.g., a criminal, terrorist, etc.). For example, a case associated with labeled case data 242a may be determined to describe terrorist financing and escalated. Accordingly, a report instance 232a may be prepared and filed to report the terrorist financing activity.

It should be apparent to one skilled in the art that other processors, operating systems, inputs (e.g., keyboard, mouse, one or more sensors, microphone, etc.), outputs (e.g., a speaker, display, haptic motor, etc.), and physical configurations are possible and within the scope of the disclosure.

Figure 3:
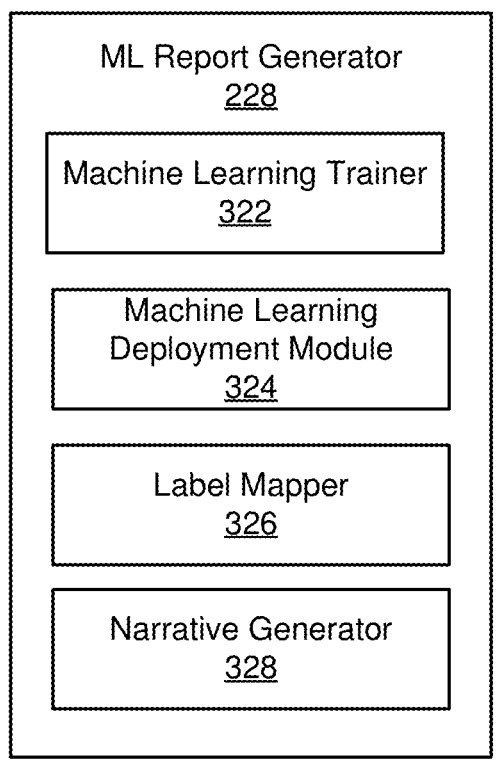
FIG. 3 illustrates a block diagram of an example machine learning report generator in accordance with some implementations.

Referring now to FIG. 3, a block diagram of an example machine learning report generator 228 is illustrated in accordance with one implementation. As illustrated in FIG. 3, the machine learning report generator 228 may include a machine learning trainer 322, a machine learning deployment module 324, a label mapper 326, and a narrative generator 328.

The description herein references a number of machine learning models 252, which may be trained and applied. For clarity and convenience, a single machine learning trainer 322 and a single machine learning deployment module 324 are illustrated in FIG. 3. In the description below, various different machine learning models are described as being trained by the machine learning trainer 322 and deployed by the machine learning deployment module 324. For example, in some implementations, a first machine learning model may be trained and deployed to apply an initial set of labels to a case, a second machine learning model may be trained and deployed to suggest one or more additional labels, a third machine learning model 252 may be trained and applied to generate a template for a template-based narrative, and a fourth machine learning model 252 may be trained and applied to perform natural language generation. However, it should be recognized that multiple instances of the machine learning trainer 322 and/or the machine learning deployment module 324 may be used. For example, a first instance of the machine learning trainer 322 and the machine learning deployment module 324 may be dedicated to training and deploying a first machine learning model, a second instance may be dedicated to training and deploying a second machine learning model, and so on.

The machine learning trainer 322 may include software and/or logic for training one or more of the machine learning models 252 described herein. The machine learning trainer 322 is communicatively coupled to receive a training set, and is communicatively coupled to the machine learning deployment module 324 to provide a machine learning model 252. For example, the machine learning trainer 322 may be communicatively coupled to one or more of the memory 204, the data storage 214, and one or more components, or subcomponents, of the machine learning report generator 228.

The machine learning trainer 322 receives training data and trains a machine learning model 252 based on the training data. In some implementations, the machine learning trainer 322 may validate the machine learning model 252. For example, in some implementations, the machine learning trainer 322 receives training data, determines a subset of the training data as validation data, trains the machine learning model 252 on the remaining test data, and validates the trained machine learning model 252 using the validation data.

The machine learning deployment module 324 may include software and/or logic for deploying one or more of the machine learning models 252 described herein. The machine learning deployment module 324 is communicatively coupled to obtain a machine learning model 252. For example, the machine learning deployment module 324 may be communicatively coupled to one or more of the memory 204, the data storage 214, and machine learning trainer 322 to receive or retrieve one or more of the machine learning models 252 described here.

The varieties of supervised, semi-supervised, and unsupervised machine learning algorithms that may be used, by the machine learning trainer 322, the train a machine learning model are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, depending on the implementation, the various machine learning models trained and deployed may or may not be based on a common algorithm (e.g., gradient boosted tree) or a common type of machine learning algorithm (e.g., supervised).

The label mapper 326 may include software and/or logic for managing one or more labels associated with a case and mapping a label to one or more reportable activities in one or more jurisdictions. The label mapper 326 is described below with reference to FIGS. 4 and 5.

The label mapper 326 is communicatively coupled to one or more of the memory 204, the data storage 214, other components 322/324/328 of the machine learning report generator 228, or subcomponents thereof.

The narrative generator 328 may include software and/or logic for generating a natural language narrative for inclusion with a report using machine learning. The narrative generator 328 is described below with reference to FIG. 6.

The narrative generator 328 is communicatively coupled to one or more of the memory 204, the data storage 214, other components 322/324/326 of the machine learning report generator 228, or subcomponents thereof.

Figure 4:
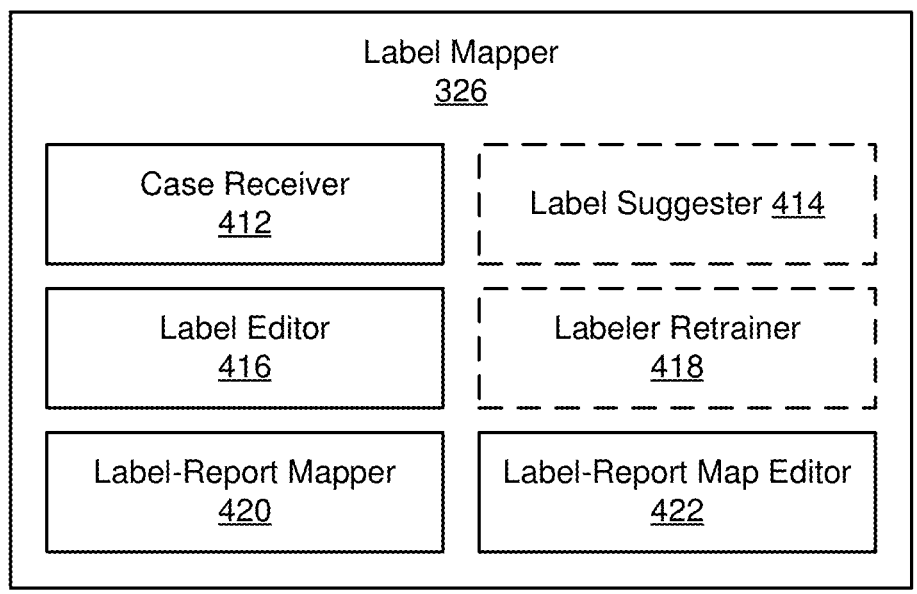
FIG. 4 illustrates a block diagram of an example label mapper in accordance with some implementations.

Referring now to FIG. 4, a block diagram of an example label mapper 326 is illustrated in accordance with one implementation. As illustrated in FIG. 4, the label mapper 326 may include a case receiver 412, an optional label suggester 414, a label editor 416, an optional labeler retainer 418, a label-report mapper 420, a label-report map editor 422.

In some implementations, the machine learning deployment module 324 applies a machine learning algorithm to generate labeled case data 242. For example, in some implementations, a case involving a series of transactions for $9999 may be assigned a "structuring" label, by the machine learning deployment module 324, and saved within labeled case data 242a.

The case receiver 412 may include software and/or logic for obtaining the labeled case data 242. The case receiver 412 is communicatively coupled to obtain the labeled case data 242. For example, the case receiver 412 may be communicatively coupled to one or more of the memory 204 and the data storage 214 to retrieve labeled case data 242 therefrom and store the labeled case data 242 therein. As another example, the case receiver 412 may be communicatively coupled to receive labeled case data 242 from machine learning deployment module 324.

In some implementations, the label mapper 326 optionally includes a label suggester 414. The label suggester 414 may include software and/or logic for suggesting additional labels to be associated with a case. In some implementations, the case receiver 412 obtains labeled case data 242; therefore, a case is associated with an initial set of labels.

In some implementations, the suggested labels are a set of labels that did not satisfy a first threshold to be included in the initial set of labels associated with the case, but satisfy a second, less stringent, threshold to be suggested for human agent consideration and inclusion. For example, the machine learning deployment module 324 had an X % confidence in applying the "Structuring" label, where X satisfied a first threshold, and a Y % confidence that a "Terrorist Financing" label should also be applied, where Y % did not satisfy the first threshold, but satisfied a more lenient second threshold.

In some implementations, the label suggester 414 may apply a machine learning model to suggest one or more additional labels to supplement the initial set of labels associated with the case. For example, the label suggester 414 is a specialized instance of the machine learning deployment module 324, which applies a label suggesting machine learning model, which is distinct from the machine learning model used to generate the initial set of labels.

Depending on the implementation, the label suggester 414 may send the one or more suggested labels for presentation to a user or provide the one or more suggested labels to the label editor 416 for presentation to the user (e.g., via the client device 106).

The label suggester 414 is communicatively coupled to obtain the labeled case data 242 and provide one or more suggested labels for presentation to a user. For example, the label suggester 414 may be communicatively coupled to one or more of the memory 204 and the data storage 214 to retrieve labeled case data 242 therefrom. As another example, the label suggester 414 may be communicatively coupled to receive labeled case data 242 from the case receiver 412. As yet another example, the label suggester 414 may be communicatively coupled to one or more of the memory 204 and the data storage 214 to store one or more suggested labels therein for retrieval by the label editor 416. In some implementations, the one or more suggested labels may be stored within the labeled case data 242. For example, the instance of labeled case data 242a may include the initial set of labels and by modified by the label suggester 414 to store the one or more suggested labels. As another example, the label suggester 414 may be communicatively coupled to send the one or more suggested labels to the label editor 416.

The label editor 416 may include software and/or logic for modifying the one or more labels associated with a case. In some implementations, the modification may include one or more of adding a label, removing a label, and changing a first label to a second label. For example, the label editor may add a suggested label or a user provided label (e.g., a label in the system but not suggested or a new label) to supplement the initial label set associated with the case. As another example, the user may remove a label associated with the case and included in the initial label set.

In some implementations, the label editor 416 modifies the one or more labels associated with the case based on user input. For example, responsive to user input indicating a selection of a suggested label for association with the case, the label suggester 414 associates the selected, suggested label with the case. For example, when the instance of labeled case data 242a is associated with "Case A" and an agent has selected to add a suggested label; in some implementations, the label editor 416 modifies the labeled case data 242a to associate that suggested label with Case A.

The presentation of labels, whether those labels are associated with the case, suggested, or a possible label within the system 100, and type of user input may vary based on the implementation. For example, in some implementations, suggested labels may be presented to the human case agent assigned to investigate the case in a user interface with the initial set of labels and selected for addition by checking a box or radio button. As another example, in some implementations, a pull-down menu may present all possible labels and a human case agent assigned to investigate the case may navigate the pull down selecting additional labels for association. In some implementations, the order of the possible labels may be dynamic and ranked, e.g., with the suggested labels presented first. As yet another example, the labels associated with a case may each be associated with a check box, radio button, or other graphical element that when selected by the user (e.g., interacting with a UI presented on a client device 106), removes the label associated with that graphical element from the set of labels associated with the case. It should be recognized that the foregoing are merely examples of presentations and user inputs for modifying a label and that other examples exist and are within the scope of this description. For example, user interfaces associated with modifying one or more labels are described below with reference to FIGS. 10a-d.

In some implementations, the label editor 418 generates modification information that describes the modifications made by the user via the label editor 416. Depending on the implementation, the modification information may vary in format and content. For examples, in some implementations, the label editor 418 may version the labeled case data 242 (e.g., create new instances of labeled case data 242) as the labels associated with a case are modified and perform a comparison between versions to generate the modification information. As another example, in some implementations, the label editor 418 may create a delta, or change, audit trail describing the modifications made to the labels associated with a case, which may be included in the labeled case data 242 associated with the case (e.g., 242a for Case A).

The label editor 416 is communicatively coupled to obtain the labeled case data 242. For example, the label editor 416 may be communicatively coupled to one or more of the memory 204 and the data storage 214 to retrieve labeled case data 242 therefrom and store the labeled case data 242 therein. As another example, the label editor 416 may be communicatively coupled to receive labeled case data 242 from one or more of the case receiver 412 and the label suggester 414.

Some implementations may optionally include a label retainer 418. The label retainer 418 may include software and/or logic for retraining one or more of the machine learning labeling models referenced herein, e.g., the machine learning model for generating the initial set of labels received by the case receiver 412 and/or the machine learning model for generating the one or more suggested labels provided by the label suggester 414. In some implementations, the retraining is based on user modification to the one or more labels associated with a case. For example, the label retainer 418 obtains modification information that describes the modifications made by the user via the label editor 416 for use in retraining. Subsequent to retraining, the machine learning labeling model(s) may beneficially provide one or more of more accurate initial label sets, more complete initial label sets, and more accurate (or relevant) suggested labels.

Depending on the implementation, the label retainer 418 may, itself, perform a retraining of the one or more of the machine learning labeling models referenced herein or may trigger the machine learning trainer 322 to retrain the machine learning model(s). For example, in some implementations, the label retainer 418 represents one or more instances of the machine learning trainer 322 that is/are used to retrain the machine learning model used to apply the initial set of labels, the machine learning model used to generate one or more suggested labels, or both. As another example, in some implementations, the label retainer 418 provides retraining information to the machine learning trainer 322 that is used, by the machine learning trainer 322, to retrain one or more of a machine learning model used to apply the initial set of labels, and the machine learning model used to suggest one or more labels.

Depending on the implementation, the retraining may take various forms including online, batch, mini-batch, etc. In some implementations, the label retainer 418 aggregates the modifications until a batch size is met and triggers a retraining. In some implementations, the batch size may be based on a number of modifications. For example, a one (1) modification per "batch" may be associated with implementations performing online learning. In some implementations, the batch size may be based on a number of cases having had their associated label(s) modified. For example, after 10 cases have had labels edited by their assigned human agent and the labeling is complete (e.g., as indicated by closing a label editing UI or selecting a graphical element indicating the user has completed label editing, such as the "Confirm" element 1072 of FIG. 10d), the label retainer 418 aggregates the batch for use in retraining by the label retainer 418 or by the machine learning trainer 322, depending on the implementation.

The label retainer 418 is communicatively coupled to obtain modification information. For example, the label retainer 418 may be communicatively coupled to one or more of the memory 204, the data storage 214, and the label editor 416 to receive, or retrieve, the modification information therefrom.

The label-report mapper 420 may include software and/or logic for applying a label-report map to one or more labels. In some implementations, applying the label-report map to the one or more labels associated with a case maps the one or more labels to one or more reportable activities in one or more jurisdictions. The label-report map, also referred to herein as the "label map" or "map," used by the label-report mapper 420 may vary based on the implementation.

The label-report mapper 420 may map a given label to one or more reportable activities. For example, referring to FIG. 5a, consider, as an example, arms dealing. Arms dealing may be its own reportable activity, it may be a terrorist activity, criminal activity, a customs violation; in some implementations, the "Arms Dealing" label 510 may be mapped to multiple potentially reportable activities as indicated by the "crime," "terrorism," and "customs violation" columns. As another example, referring to FIG. 5b, consider, as an example, gambling. Gambling may take many different forms including, but not limited to, a state lottery, bingo, tribal casino, card room, horse race, sports betting, etc.; in some implementations, the "Gambling" label may be mapped to multiple potentially reportable activities as indicated by the state lottery," "bingo," "tribal casino," "card room," "horse race," sports betting" columns.

The label-report mapper 420 may map the label to reportable activity in one or more jurisdictions. Different jurisdiction may define the same reportable activity differently. For example, referring again to the example of FIG. 5a, the "Arms Dealing" label 510 is mapped to multiple jurisdictions as indicated by the "US," "EU," and "CN" rows. As another example, referring again to FIG. 5b, the "Gambling" label 530 is mapped to multiple jurisdictions including the states of California, Nevada, and Utah, as indicated by the "CA," "NV," and "UT" rows.

Whereas existing solutions rely upon the human case agent's knowledge and experience to know how a given activity is defined and should be reported in each jurisdiction to which the entity is required to report, the label-report mapper 420 may use the labels to automatically identify reportable activity in one or more jurisdictions. For example, referring again to FIG. 5a, it should be recognized that the mapping of table 520 allows the label-report generator 420 to use a label, which may be automatically assigned based on machine learning, while capturing jurisdictional nuances and differences in the how activity, i.e., "Arms Dealing" in the present example, is reported as a customs violation in the United States, as terrorism and a customs violation in the European Union, and as a crime and customs violation in China. As another example, referring again to FIG. 5b, it should be recognized that the mapping of table 540 allows the label-report generator 420 to use a label, i.e., "Gambling" in the present example, while capturing the jurisdictional differences between various states regarding what kind of gambling is permitted and what kind is not permitted and reportable. To summarize and simplify, the label-report map may provide a one-to-many mapping of a label to reportable activities and/or a one-to-many mapping of a label to jurisdictions.

It should be recognized that the example mappings, labels, jurisdictions, and reportable activity described with reference to FIGS. 5a and 5b and elsewhere herein are provided for clarity and convenience and are comprehensive are not limiting the labels, reportable activity, jurisdictions, and mappings are within the scope of this disclosure. Other labels, reportable activity, jurisdictions, and mappings are contemplated and within the scope of this disclosure. For example, with regard to example mappings, FIGS. 5a and 5b include tabular mappings where each table 520/540 is associated with a label 510/520, columns are associated with reportable activities, and rows are associated with jurisdictions. However, in some implementations (not shown), jurisdiction may be associated with its own table (or sheet), each row is associated with a label, and each column is associated with a reportable activity in the label-report map. In some implementations (not shown), the label-report mapping may not be tabular. For example, the mapping may use a graph database or other data structure.

In some implementations, the label-report mapper 420 may map a label to a portion of a reporting form for reporting the activity to a particular jurisdiction. For example, referring again to the example of FIG. 5a and arms dealing. In some implementations, the map may include information identifying a report or portion of a report within the map. For example, rather than an "x" appearing in the cells associated with the reportable activities "terrorism" and "customs violation" form identification information may be present that references a form and/or field(s) for reporting terrorism in the EU-Terrorism cell, and a form and/or field(s) for reporting a customs violation in the EU. The form identification information's content and format may depend on the implementation. For example, in some implementations, the form information may be a foreign key instead of the illustrated "X," and the foreign key is a primary key in a child table, which in some implementations may identify one or more of the relevant report form and/or field(s) in the report form, and the supporting information and/or documentation for reporting the activity.

In some implementations, the label-report mapper 420 may map a label to one or more categories of activity (not shown). A category may be associated with one or more labels. For example, a "high volume in short period of time" label may be associated with a "terrorist financing" category as well as a "structuring" category.

In some implementations, label-report mapper 420 pre-populates at least a portion of a report based on the mapping. For example, in some implementations, the label-report mapper 420 maps the "structuring" label to reportable activity in the US, and based on the mapping identifies a reporting form for reporting transaction structuring in the US, and prepopulates a portion of the form requesting transaction information with the requested transaction information (e.g., transaction dates, amounts, and parties) from the labeled case data 242.

The label-report mapper 420 is communicatively coupled to receive one or more labels and a label-report map. For example, the label-report mapper 420 may be communicatively coupled to one or more of the memory 204, the data storage 214, and the label editor 416 to retrieve, or receive, the labels. As another example, the label-report mapper 420 may be communicatively coupled to one or more of the memory 204, the data storage 214, and the label-report map editor 416 to retrieve, or receive, the label-report map (not shown).

The label-report map editor 422 may include software and/or logic for editing the label-report map. As the map may vary depending on the implementation, the editing of the map may also vary depending on the implementation. For example, in implementations where each jurisdiction is associated with its own sheet (or table), each row in a sheet is associated with label, and each column is associated with a reportable activity, the label-report map editor 422 may edit the mapping to add a new jurisdiction by creating and populating a new sheet, and may edit whether a label is associated with a reportable activity in a jurisdiction by accessing that jurisdictions sheet and modifying the cell in the row associated with that label and the column associated with that reportable activity. As another example, in implementations where each label is associated with its own sheet (or table), each row in a sheet is associated with a jurisdiction, and each column is associated with a reportable activity, the label-report map editor 422 may add a jurisdiction by adding a row to each label sheet, and may edit whether a label is associated with a reportable activity in a jurisdiction by accessing that label's sheet and modifying the cell in the row associated with that jurisdiction and the column associated with that reportable activity.

Depending on the implementation, the label-report map may be user generated, user edited, machine generated, machine edited, or a combination thereof using the label-report map editor 422. In some implementations, the label-report map editor 422 provides an interface (not shown) by which a (human) user may create or modify a label-report map. For example, the label-report map editor 422 provides an interface (not shown) by which a (human) user may import, create, or modify a label-report map table, such as that illustrated in FIG. 5a or FIG. 5b. In some implementations, the label-report map editor 422 uses machine learning to create and/or modify a label-report map. For example, the label-report map editor 422 obtains reports that were and the associated labels, and applies a machine learning algorithm, or triggers the machine learning trainer 322, to infer how the labels map to one or more of the reported activities, the jurisdictions to which a report was filed, the type of report or form used, the portion(s) of the report/form associated with the label, etc. In some implementations, the label-report map may be generated using machine learning and modified by a human user (e.g., to correct errors or to capture changes to a form or reportable activities in a jurisdiction).

The label-report map editor 422 is communicatively coupled to one or more of the memory 204 and the data storage 214, e.g., to store and retrieve a label-report map (not shown). In some implementations, the label-report map editor is communicatively coupled to the label-report mapper 420 to provide the label-report map.

Figure 6:
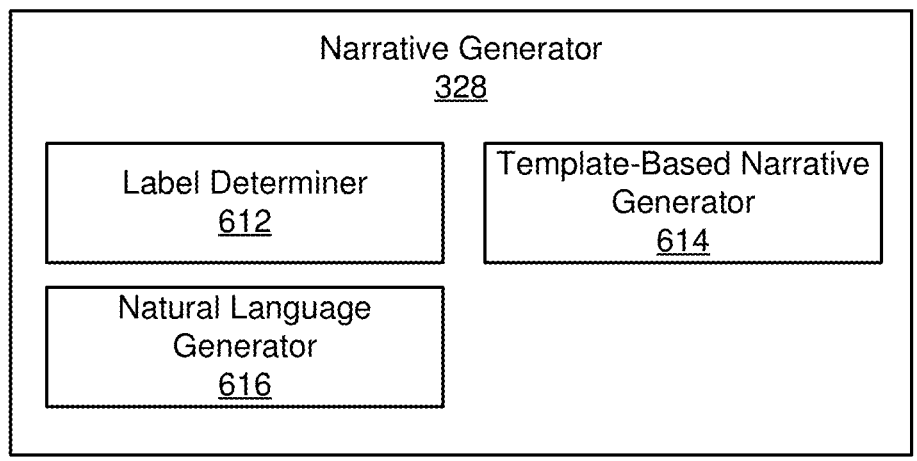
FIG. 6 illustrates a block diagram of an example narrative generator in accordance with some implementations.

Referring now to FIG. 6, a block diagram of an example narrative generator 328 is illustrated in accordance with one implementation. As illustrated in FIG. 6, the narrative generator 328 may include a label determiner 612, template-based narrative generator 614, and a natural language generator.

The label determiner 612 may include software and/or logic for determining one or more of a set of labels associated with case and a category of labels associated with the case. For example, the label determiner may determine that a case is associated with a "high volume short period" label, and determine whether that label is associated with a "structuring" category or "terrorist financing category," as that label may belong to both categories in some implementations.

The label determiner 612 is communicatively coupled to obtain labels and categories. For example, the label determiner 612 may be communicatively coupled to one or more of the memory 204 and the data storage 214 to retrieve the labels and categories therefrom (e.g., from the labeled case data 242). In another example, the label determiner 612 is communicatively coupled to the label mapper 326 or subcomponent thereof (e.g., 416 or 420) to receive the labels and categories.

The template-based narrative generator 614 may include software and/or logic for generating a template-based narrative for inclusion in a report. For clarity and convenience, an example in which the narrative is for inclusion in a summary section and the label is "high volume short period of time," which is associated with a "structuring" category. However, it should be recognized this is merely one example and other examples exist and are within the scope of the description.

The template-based narrative generator 614 generates the template-based narrative by applying a template. In some implementations, the template is associated with a set of one or more labels and one or more categories. For example, the template-based narrative generator 614 retrieves the template based on "high volume short period of time," which is associated with a "structuring" category, since a narrative for that label in association with a "terrorist financing" category may generate a very different narrative. In some implementations, the template is heuristics-based. For example, the template based on "high volume short period of time," which is associated with a "structuring" category includes a rule to concatenate a description of each transaction included in the "high volume" over the "short period of time" and a rule defining how each of such transactions is described, and a rule defining how each transaction description is separated from the previous and/or next. For example, the template-based narrative may read as "2021-09-01 $9,999 from Party A Account X to Party B Account Y; 2021-09-01 $9,995 from Party A Account Z to Party B Account Y; 2021-09-08 $9,990 from Party A Account X to Party B Account Y; 2021-09-15 $9,993 from Party A Account X to Party B Account Y; 2021-09-15 $9,998 from Party A Account Z to Party B Account Y."

The template-based narrative generator 614 is communicatively coupled to obtain a template, a label set, and a category. For example, the template-based narrative generator 614 may be communicatively coupled to one or more of the memory 204 and the data storage 214 to obtain a template (not shown), a label set (e.g., from the labeled case data 242), and a category (e.g., from the labeled case data 242).

The natural language generator 616 may include software and/or logic for generating a narrative by applying natural language generation to the template-based narrative generated by the template-based narrative generator 614.

In some implementations, the natural language generator 616 is a specialized instance of the machine learning deployment module 324 and performs natural language generation based on a machine learning model generated by the machine learning trainer 322. In some implementations, the natural language generator model is trained by obtaining reports that were human-written, determining a set of labels and categories associated with the case that generated the report, generating a template-based narrative based on the label(s) and associated categories, dividing that data based on category, and training a natural language generator model for each category using the human-written reports associated with that category and the template-based narrative generated based on the labels and associated with the category.

In some implementations, the template-based narrative generator, when deployed, receives the template-based narrative and, optionally, a category as an inputs and outputs the natural language generated narrative.

The natural language generator 616 is communicatively coupled to receive a template-based narrative and a category. For example, the natural language generator 616 may be communicatively coupled to the template-based narrative generator 614 to receive a template-based narrative. As another example, the natural language generator 616 may be communicatively coupled one or more of the memory 204 and the data storage 214 to retrieve a template-based narrative and a category.

Example Methods

FIGS. 7a-9b are flowcharts of example methods that may, in accordance with some implementations, be performed by the systems described above with reference to FIGS. 1-6. The methods 700a, 700b, 800, 900a and 900b of FIGS. 7a-9 are provided for illustrative purposes, and it should be understood that many variations exist and are within the scope of the disclosure herein.

Figure 7A:
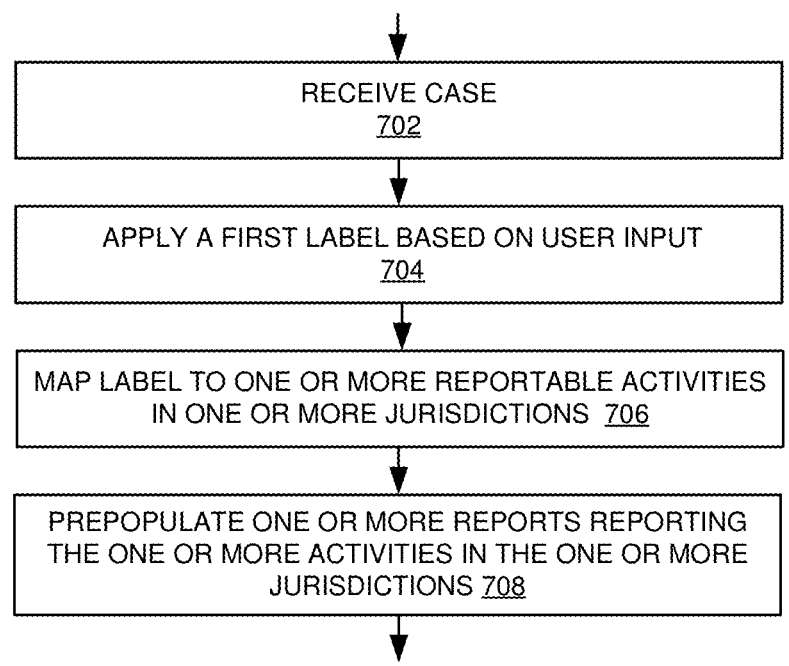
FIG. 7a illustrates a flowchart of an example method for using label mapping in accordance with some implementations.

FIG. 7a is a flowchart of an example method 700a for using label mapping in accordance with some implementations. The method 700a begins at block 702. At block 702, the case receiver 412 receives a case. At block 704, the label editor 416 applies a first label based on user input. At block 706, the label-report mapper 420 maps the first label, applied at block 704, to one or more reportable activities in one or more jurisdictions. At block 708, the label-report mapper 420 prepopulates one or more reports reporting the one or more reportable activities in the one or more jurisdictions.

Figure 7B:
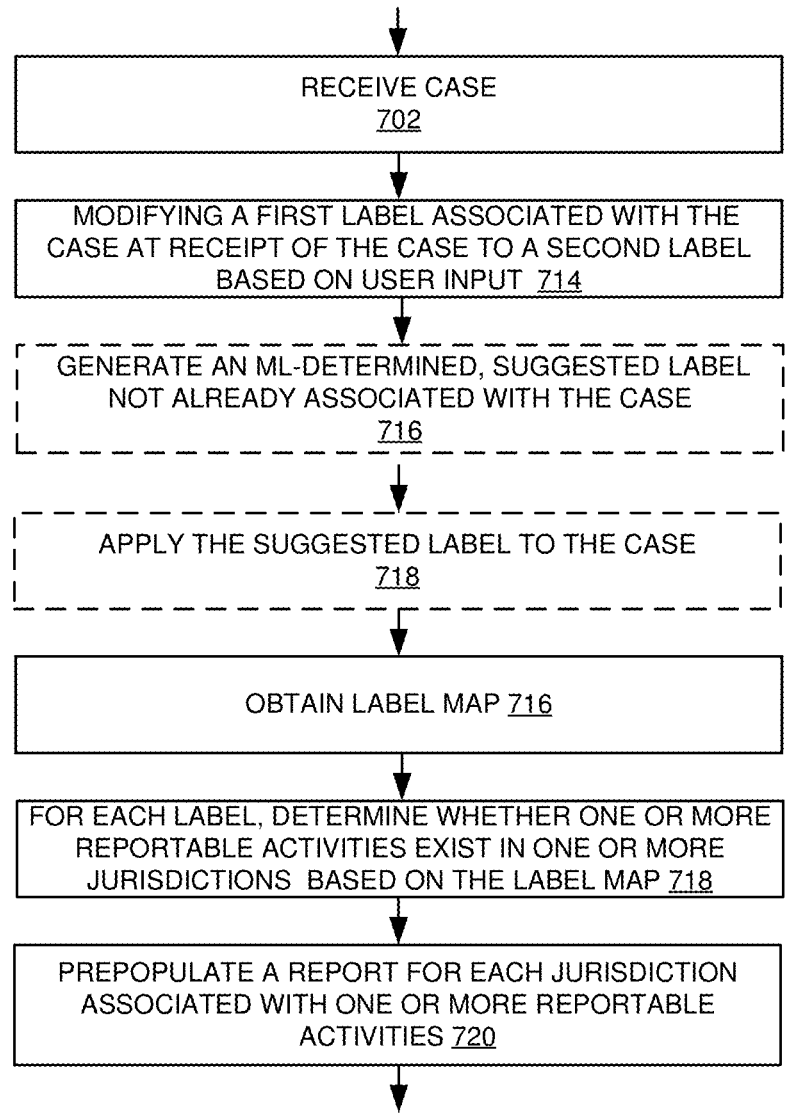
FIG. 7b illustrates a flowchart of an example method for using label mapping in accordance with some implementations.

FIG. 7b is a flowchart of another example method 700b for using label mapping in accordance with some implementations. The method 700b begins at block 702. At block 702, the case receiver 412 receives a case. At block 714, the label editor 416 modifies a first label associated with the case at receipt of the case to a second label based on user input. At block 716, the label suggester 414 generates a ML-determined, suggested label not already associated with the case. At block 718, the label editor 416 applies the suggested label to the case. At block 716, the label-report mapper 420 obtains a label map. At block 718, the label-report mapper 420, for each label associated with the case, determines whether one or more reportable activities exist in one or more jurisdictions based on the label map obtained at block 716. At block 720, the label-report mapper 420 prepopulates a report for each jurisdiction associated with one or more reportable activities.

Figure 8:
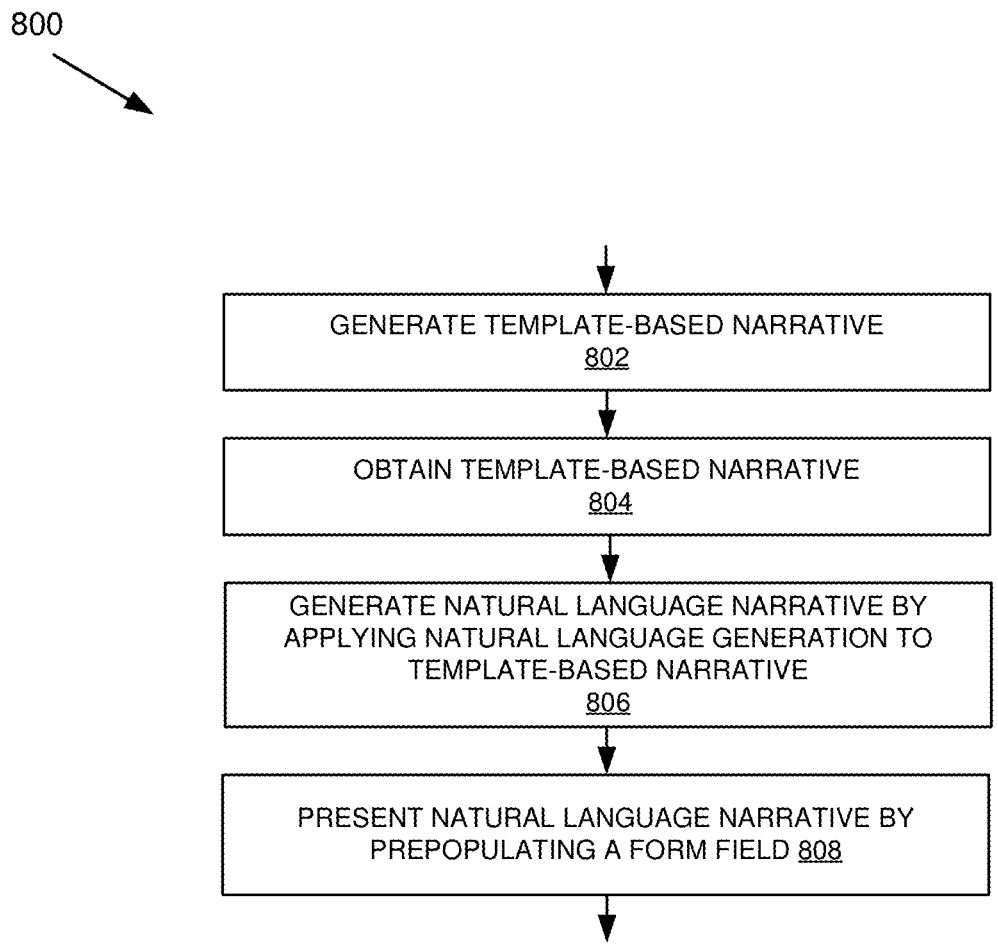
FIG. 8 illustrates a flowchart of an example method 800 for generating a natural language narrative in accordance with some implementations.

FIG. 8 is a flowchart of an example method 800 for generating a natural language narrative in accordance with some implementations. At block 802, the template based narrative generator 614 generates a template-based narrative. At block 804, the natural language generator 616 obtains the template-based narrative generated at block 802, and, at block 806, generates a natural language narrative applying natural language generation to the template-based narrative generated at block 802. At block 808, the natural language generator 616 presents the natural language narrative by pre-populating a form field, e.g., a field in a SAR report.

Figure 9A:
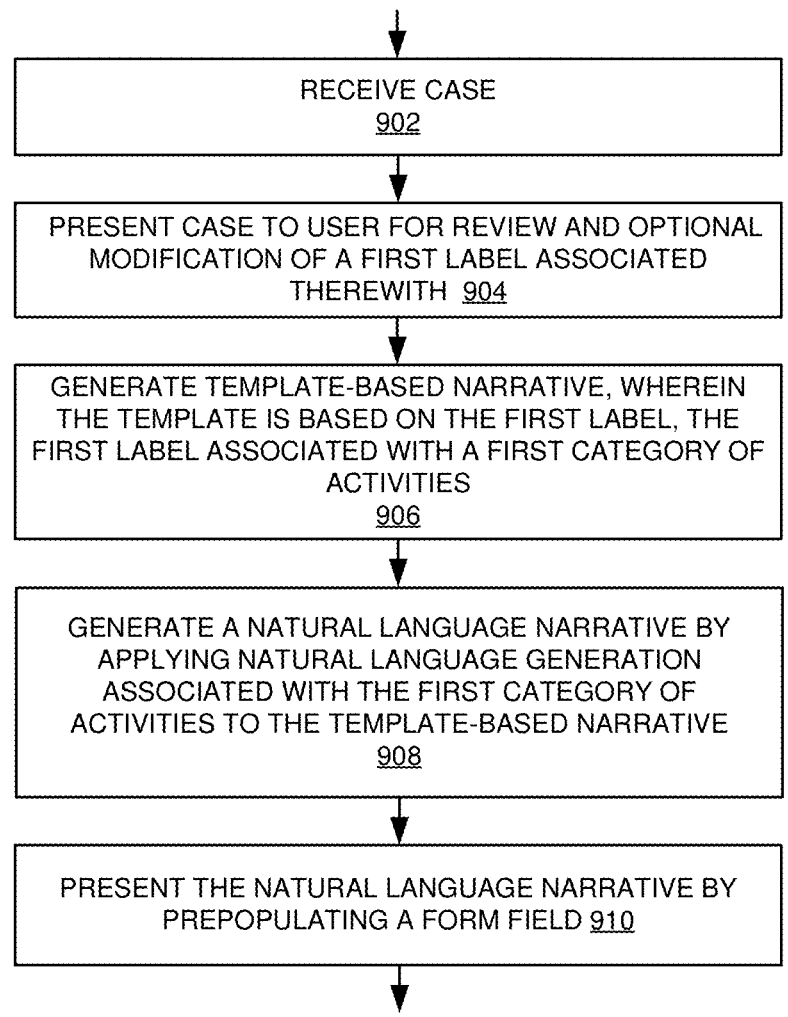
FIG. 9a illustrates a flowchart of another example method 900a for generating a natural language narrative in accordance with some implementations.

FIG. 9a is a flowchart of another example method 900a for generating a natural language narrative in accordance with some implementations. At block 902, the case receiver 412 receives a case. At block 904, the label editor 416 presents the case, received at block 902, to the user for review and optional modification of a first label associated with the case. At block 906, the template-based narrative generator 614 generates a template-based narrative, wherein the template is based on the first label, and the first label is associated with a first category of activities. At block 908, the natural language generator 616 generates a natural language narrative by applying natural language generation associated with the first category of activities to the template-based narrative. At block 910, the natural language generator 616 presents the natural language narrative by pre-populating a form field, e.g., a field in a SAR report.

Figure 9B:
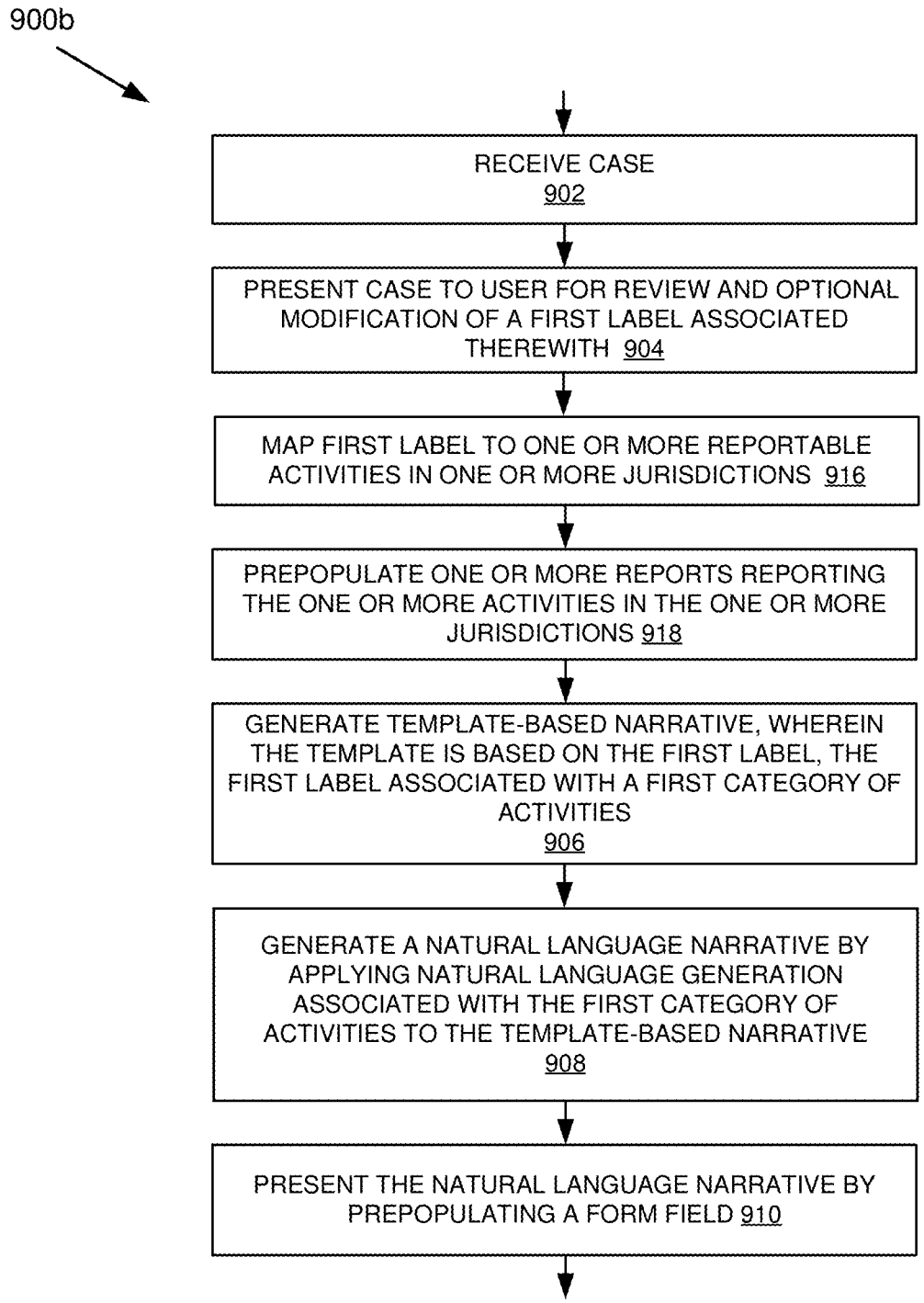
FIG. 9b illustrates a flowchart of yet another example method 900b for generating a natural language narrative in accordance with some implementations.

FIG. 9b is a flowchart of yet another example method 900b for generating a natural language narrative in accordance with some implementations. At block 902, the case receiver 412 receives a case. At block 904, the label editor 416 presents the case, received at block 902, to the user for review and optional modification of a first label associated with the case. At block 916, the label-report mapper 420 maps the first label to one or more reportable activities in one or more jurisdictions. At block 918, the label-report mapper 420 prepopulates one or more reports reporting the one or more reportable activities in the one or more jurisdictions. At block 906, the template-based narrative generator 614 generates a template-based narrative, wherein the template is based on the first label, and the first label is associated with a first category of activities. At block 908, the natural language generator 616 generates a natural language narrative by applying natural language generation associated with the first category of activities to the template-based narrative. At block 910, the natural language generator 616 presents the natural language narrative by pre-populating a form field, e.g., a field in a SAR report.

Example User Interface

Figure 10A:
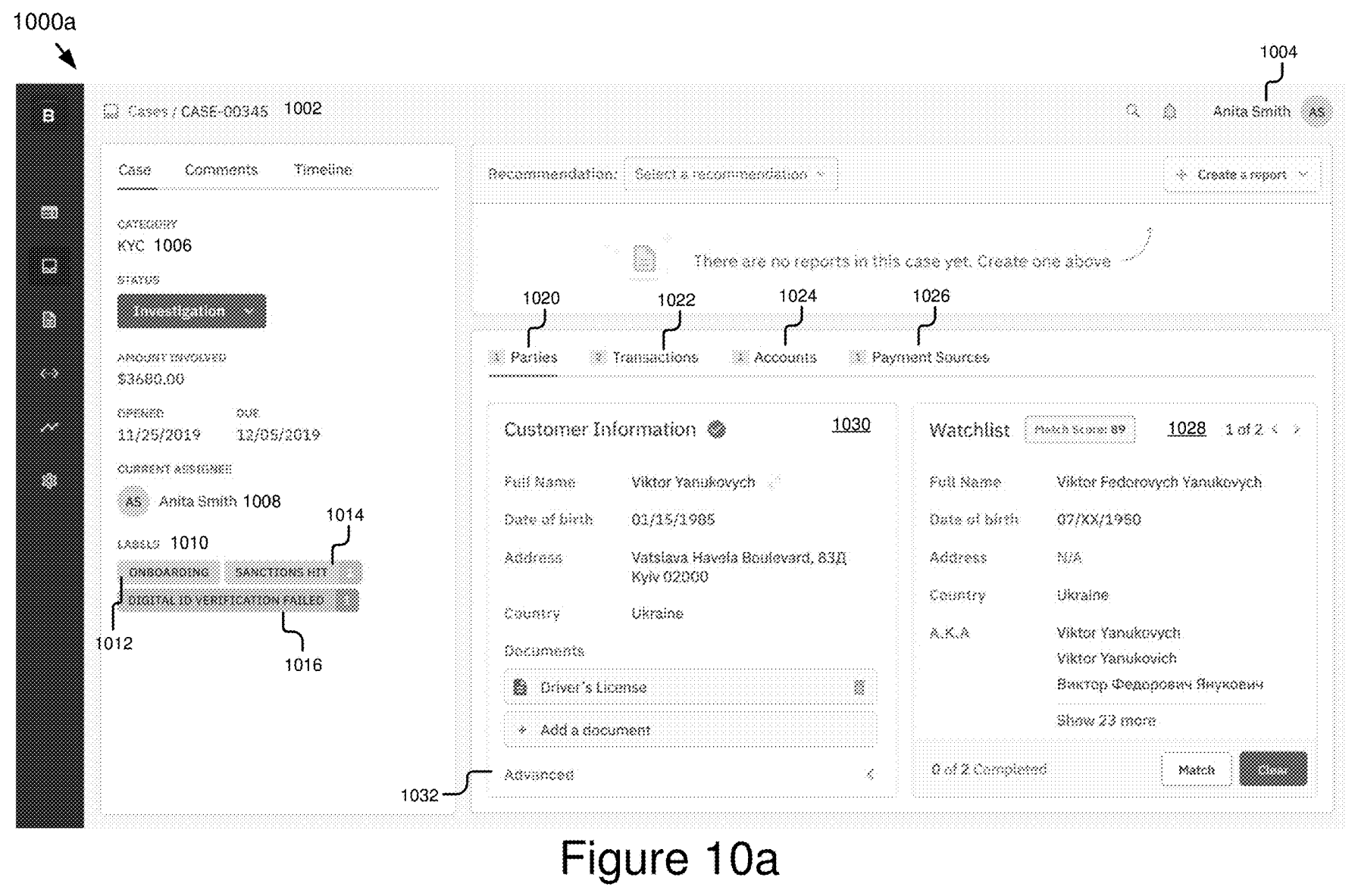
Figure 10C:
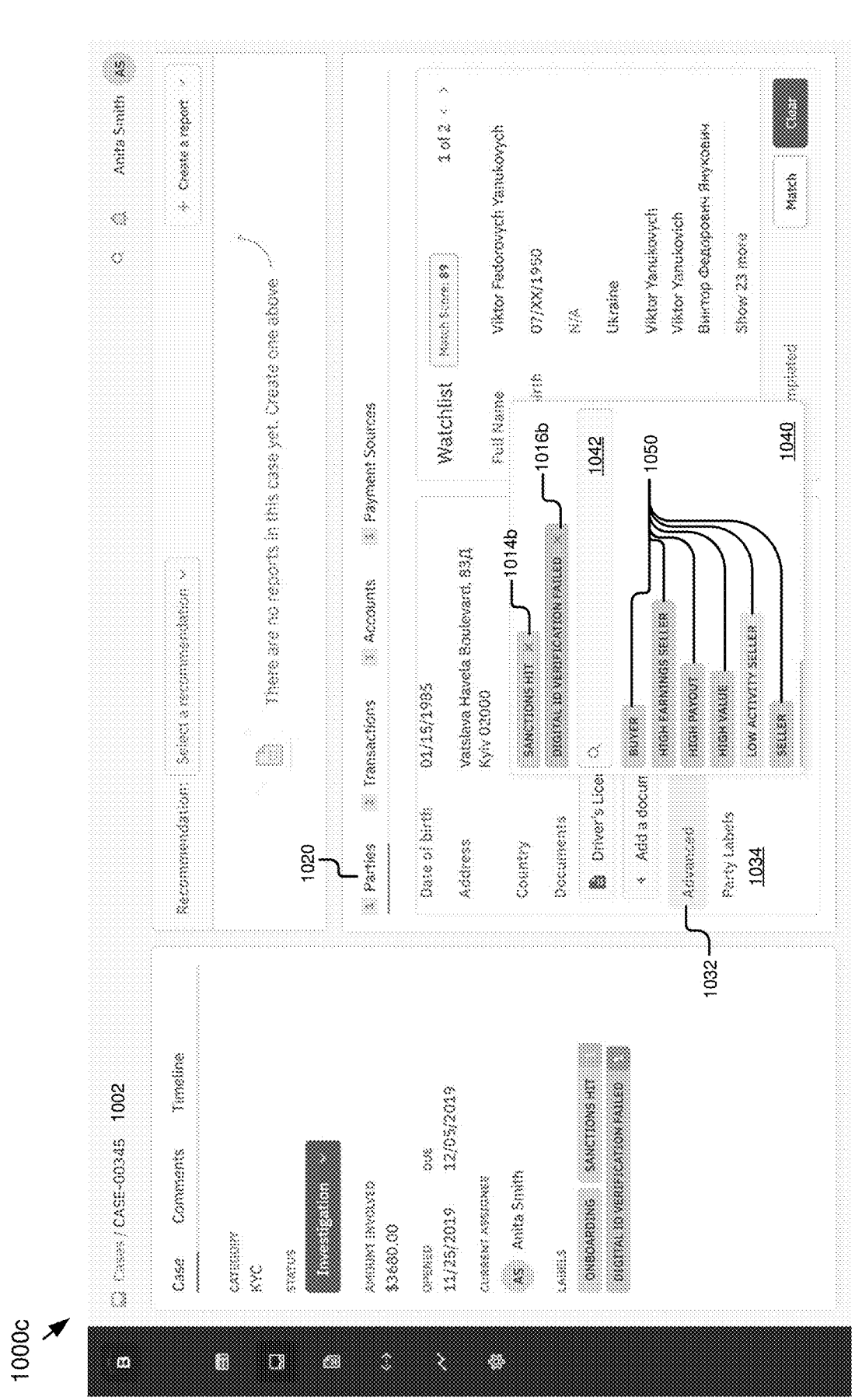

FIGS. 10a-d illustrate example user interfaces associated with label editing in accordance with some implementations. FIG. 10a illustrates an example of a user interface (UI) 1000a associated with label editing in accordance with some implementations. The UI 1000a displays case "CASE-00345" as indicated at 10002. The UI 1000a is presented to a user "Anita Smith" as indicated at 1004, who is the currently assigned case manager as indicated at 1008. The case is associated with a category "KYC," or know your customer, as indicated by 1006. The case is associated with a set of labels 1010 including "onboarding" 1012, "sanctions hit" 1014, and "digital ID verification failed" 1016. The KYC case is associated with sub-categories of "Parties," "Transactions," "Accounts," and "Payment Sources," as indicated by tabs 1020, 2022, 1024, and 1026, respectively. As illustrated in FIG. 10a, the Parties 1020 tab is presently selected and "Customer Information" is displayed in panel 1030, and "Watchlist" information is displayed in panel 1028. The "Customer Information" panel 1030 includes an "Advanced" graphical element 1032. In some implementations, when "Advanced" 1032 is selected by a user, e.g., Anita Smith, the user interface 1000a transitions to user interface 1000b.

Referring now to FIG. 10b, an example of a user interface (UI) 1000b associated with label editing in accordance with some implementations. Upon selection of "Advanced" 1032, the "Party Labels" 1034 are displayed. It should be noted that the labels 1010 associated with the case 1002 include "onboarding" 1012, "sanctions hit" 1014, and "digital ID verification failed" 1016, and an instance of the "sanctions hit" label 1014a and of the "digital ID verification failed" label 1016a are presented. This indicates that the sanctions hit "sanctions hit" 1014 and "digital ID verification failed" 1016 labels are associated with the "Parties" sub-category, and the "onboarding" label 1012 is associated with another sub-category, e.g., account. The label instances 1014a and 1016a indicate those labels are presently associated the case 1002. Selection of the "X" in the label instances 1014a and 1016a removes the associated label from the case 1002. Selection of the "Add" graphical element 1036 allows a user 112 to add one or more other labels. In some implementations, when "Add" 1036 is selected by a user, e.g., Anita Smith, the user interface 1000b transitions to user interface 1000c.

Referring now to FIG. 10c, an example of a user interface (UI) 1000c associated with label editing in accordance with some implementations. Upon selection of "Add" 1036, of FIG. 10b, the window 1040 is presented. In window 1040, the labels presently associated with the case 1002 in the presently selected subcategory 1020 are presented, i.e., "sanctions hit" 1014*b* and digital ID verification failed 1016*b*. In the illustrated implementation, a search field 1042 is presented below the assigned labels 1014*b* and 1016*c*, which may receive a query for a label from the user. In the illustrated implementation, additional labels 1050 associated with the parties sub-category are presented below the search field 1042. In some implementations, the additional labels 1050 may be presented in an organized order. Examples of an organized order may include, but is not limited to, alphabetically, based on a rate of usage of the label, based on a recommendation or strength of recommendation to use the label by the label suggester 414.

Figure 10D:
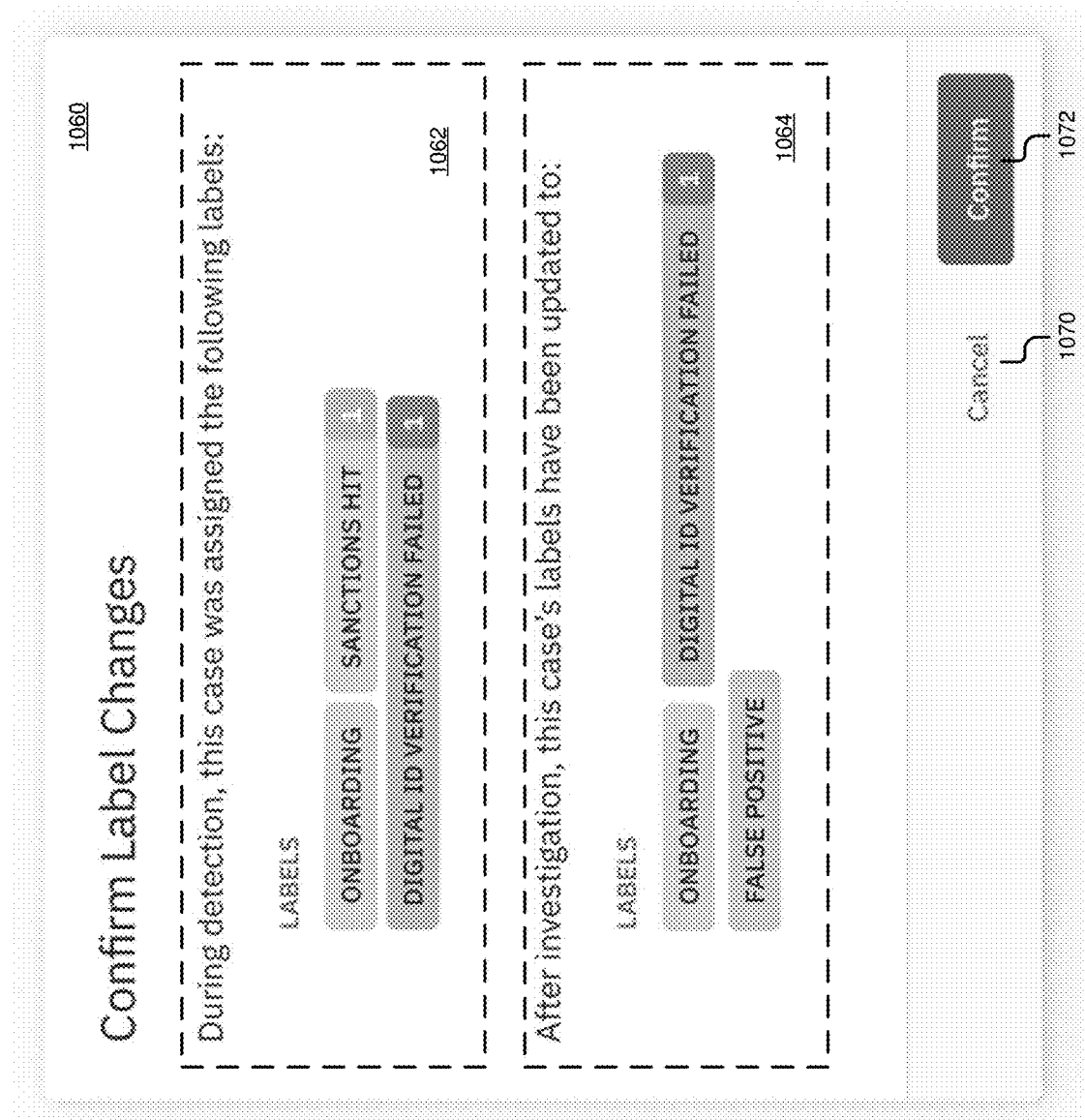

Referring now to FIG. 10*d*, an example of a user interface (UI) 1060 associated with label editing in accordance with some implementations. In some implementations, after modifying one or more of the labels assigned to the case, the changes are presented for verification, e.g., in user interface 1060. In the illustrated interface 1060, a previous set of labels is presented in area 1062, and a modified set of labels is presented in area 1064, and the user is prompted to confirm 1072 or cancel the modifications. In the illustrated example, interface 1060 indicates that the "sanctions hit" label was removed and a "false positive" label was added, which may indicate that the individual being onboarded shares a name, and perhaps one or more other vital statistics, with an individual on a sanctions list but is not the sanctioned individual.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
   receiving, using one or more processors, a case;
   mapping, using the one or more processors, a first label to a series of reportable activities in one or more jurisdictions, the first label associated with the case by a machine learning model based on the first label meeting a first threshold confidence level;
   prepopulating, using the one or more processors, one or more reports, the one or more reports reporting the series of reportable activities in the one or more jurisdictions;
   generating, using the one or more processors, a template-based narrative, wherein a template is based on the first label, the first label associated with a first category of activities;
   generating, using the one or more processors, a natural language narrative by applying natural language generation associated with the first category of activities to the template-based narrative;
   prepopulating, using the one or more processors, a form field with the natural language narrative;
   receiving, based on user input, a modification to an initial set of labels associated with the case, the modification including the first label; and
   retraining the machine learning model that generates initial sets of labels associated with cases.

2. The computer implemented method of claim 1 further comprising:
   generating, based on machine learning, a second label as a suggested label, the second label unassociated with the case at a time the case was received, wherein the second label meets a second threshold confidence level; and
   applying the second label to the case based on user input indicating a selection to add the second label to the case.

3. The computer implemented method of claim 1, wherein the case includes a set of initial labels including the first label, wherein the set of initial labels are generated based on machine learning and wherein the set of initial labels meet the first threshold confidence level.

4. The computer implemented method of claim 1, wherein the template uses heuristics to generate the template-based narrative.

5. The computer implemented method of claim 1, further comprising:
   receiving a plurality of human-written reports;
   determining a subset of the human-written reports based on cases associated with the first label and the first category of activities;
   generating a template-based narrative for each of the human-written reports in the subset of human-written reports based on cases associated with the first label and the first category of activities; and
   training the natural language generation based on the template-based narratives generated for each of the human-written reports in the subset of human-written reports based on cases associated with the first label and the first category of activities and the subset of human-written reports.

6. The computer implemented method of claim 1, wherein the first label is also associated with a second category of activities, and natural language narratives for cases associated with the first label and the second category of activities use a distinct natural language generation trained based on template-based narratives generated for human-written reports based on cases associated with the first label and the second category of activities and the human-written reports based on cases associated with the first label and the second category of activities, the method further comprising:
   generating a second template-based narrative based on the first label in association with a second category of activities; and
   generating a second natural language narrative by applying the distinct natural language generation associated with the second category of activities to the second template-based narrative.

7. The computer implemented method of claim 1, wherein the mapping of the first label to the series of reportable activities in one or more jurisdictions uses a tabular data structure.

8. The computer implemented method of claim 1, wherein the mapping of the first label to the series of reportable activities in one or more jurisdictions uses a graph database.

9. A computer implemented method comprising:
assigning, using one or more processors, a predefined label to a case using a machine learning model;
determining a series of reportable activities in one or more jurisdictions based on previously labeled case data;
mapping, using the one or more processors, a first label to the series of reportable activities in one or more jurisdictions, based on the predefined label being assigned to the case;
prepopulating, using the one or more processors, one or more reports reporting the series of reportable activities in the one or more jurisdictions based on the first label and the predefined label;
receiving, based on user input, a modification to an initial set of labels associated with the case, the modification including the first label; and
retraining the machine learning model that generates initial sets of labels associated with cases.

10. The computer implemented method of claim 9 further comprising:
generating, based on machine learning, the first label as a suggested label, the first label unassociated with the case at a time the case was received; and
applying the first label to the case based on user input.

11. The computer implemented method of claim 9, wherein the case includes a set of initial labels including the first label, wherein the set of initial labels are generated based on machine learning.

12. The computer implemented method of claim 9, wherein the mapping of the first label to the series of reportable activities in one or more jurisdictions uses a tabular data structure.

13. The computer implemented method of claim 9, wherein the mapping of the first label to the series of reportable activities in one or more jurisdictions uses a graph database.

14. A computer implemented method comprising:
determining, using one or more processors, one or more labels associated with a case, the one or more labels associated with the case based on meeting a first threshold confidence level;
generating, using the one or more processors, a template-based narrative associated with the case, wherein a template is based on a first label of the one or more labels, the first label mapped to a first series of reportable activities;
generating, using the one or more processors, a natural language narrative by applying natural language generation associated with the first series of reportable activities to the template-based narrative;
prepopulating, using the one or more processors, a form field with the natural language narrative;
receiving, based on user input, a modification to the natural language narrative associated with the first series of reportable activities, the modification including the first label; and
training a machine learning model that generates natural language narratives associated with the first series of reportable activities.

15. The computer implemented method of claim 14, wherein the template uses heuristics to generate the template-based narrative.

16. The computer implemented method of claim 14, further comprising:
receiving a plurality of human-written reports;
determining a subset of the human-written reports based on cases associated with the first label and the first series of reportable activities;
generating a template-based narrative for each of the human-written reports in the subset of human-written reports based on cases associated with the first label and the first series of reportable activities; and
training the natural language generation based on the template-based narratives generated for each of the human-written reports in the subset of human-written reports based on cases associated with the first label and the first series of reportable activities and the subset of human-written reports.

17. The computer implemented method of claim 14, wherein the first label is also associated with a second category of activities, and natural language narratives for cases associated with the first label and the second category of activities use a distinct natural language generation trained based on template-based narratives generated for human-written reports based on cases associated with the first label and the second category of activities and the human-written reports based on cases associated with the first label and the second category of activities, the method further comprising:
generating a second template-based narrative based on the first label in association with a second category of activities; and
generating a second natural language narrative by applying the distinct natural language generation associated with the second category of activities to the second template-based narrative.

18. The computer implemented method of claim 14, wherein the first label is mapped to the first series of activities using a tabular data structure.

19. The computer implemented method of claim 14, wherein the first label is mapped to the first series of activities using a graph database.

* * * * *